US011176056B2

(12) United States Patent
Tzortzatos et al.

(10) Patent No.: US 11,176,056 B2
(45) Date of Patent: Nov. 16, 2021

(54) PRIVATE SPACE CONTROL WITHIN A COMMON ADDRESS SPACE

(71) Applicant: INTERNATIONAL BUSINESS MACHINES CORPORATION, Armonk, NY (US)

(72) Inventors: Elpida Tzortzatos, Lagrangeville, NY (US); Steven M. Partlow, Beacon, NY (US); Scott B. Compton, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 47 days.

(21) Appl. No.: 16/456,084

(22) Filed: Jun. 28, 2019

(65) Prior Publication Data
US 2020/0409865 A1 Dec. 31, 2020

(51) Int. Cl.
*G06F 12/1081* (2016.01)
*G06F 9/30* (2018.01)
*G06F 12/109* (2016.01)

(52) U.S. Cl.
CPC ...... *G06F 12/1081* (2013.01); *G06F 9/30123* (2013.01); *G06F 12/109* (2013.01)

(58) Field of Classification Search
CPC . G06F 12/1081; G06F 9/30123; G06F 12/109
See application file for complete search history.

(56) References Cited

U.S. PATENT DOCUMENTS

| 4,945,480 A | 7/1990 | Clark et al. |
| 5,023,773 A | 6/1991 | Baum et al. |
| 5,220,669 A | 6/1993 | Baum et al. |

(Continued)

FOREIGN PATENT DOCUMENTS

EP    1168158 A2    1/2002

OTHER PUBLICATIONS

Salla et al "IBM Redbook ABCs of zOS vol. 10" May 4, 2018, [retrieved on Oct. 16, 2020]. Retrieved from the Internet:< URL: http://www.redbooks.ibm.com/abstracts/SG246990.html> (Year: 2018).*

(Continued)

*Primary Examiner* — Masud K Khan
*Assistant Examiner* — Dustin B. Fulford
(74) *Attorney, Agent, or Firm* — Cantor Colburn LLP; Teddi Maranzano

(57) ABSTRACT

A non-limiting example computer-implemented method includes receiving instructions to switch an operational context of a dynamic address translation (DAT) structure to a new operational context. It is determined if context switching has been enabled within the DAT structure. Based on determining that context switching is enabled, it is determined if the new operational context of the DAT structure is different than a current operational context of the DAT structure. It is chosen whether to switch to a full operational context based on the new operational context being different than the current operational context. If the full operational context is used, a full space DAT structure is set up and a private space bit is set to OFF, and if the full operational context is not used, a partial space DAT structure is set up and the private space bit is set to ON.

20 Claims, 6 Drawing Sheets

(56) References Cited

U.S. PATENT DOCUMENTS

| | | | |
|---|---|---|---|
| 5,361,356 | A | 11/1994 | Clark et al. |
| 5,745,676 | A | 4/1998 | Hobson et al. |
| 5,873,128 | A | 2/1999 | Kimura et al. |
| 5,923,864 | A | 7/1999 | Inoue |
| 6,286,089 | B1 | 9/2001 | Greiner et al. |
| 6,553,477 | B1 | 4/2003 | Krishna et al. |
| 6,976,255 | B1 | 12/2005 | Clark et al. |
| 9,576,031 | B1 | 2/2017 | Aggarwal et al. |
| 9,792,160 | B2 | 10/2017 | Shear et al. |
| 10,075,384 | B2 | 9/2018 | Shear et al. |
| 2005/0257030 | A1 | 11/2005 | Langhammer |
| 2009/0217098 | A1* | 8/2009 | Farrell .................. G06F 11/073 714/37 |
| 2010/0185831 | A1* | 7/2010 | Iguchi ................. G06F 12/1027 711/207 |
| 2013/0339562 | A1* | 12/2013 | Greiner .................. G06F 9/466 710/262 |
| 2014/0068137 | A1 | 3/2014 | Kegel et al. |
| 2014/0181463 | A1* | 6/2014 | Greiner ............... G06F 12/1027 711/207 |
| 2014/0208059 | A1 | 7/2014 | Kogge |
| 2018/0060121 | A1 | 3/2018 | Nassi et al. |
| 2018/0373561 | A1 | 12/2018 | Nassi et al. |
| 2019/0163643 | A1 | 5/2019 | Yang |
| 2020/0409857 | A1 | 12/2020 | Tzortzatos et al. |
| 2020/0409862 | A1 | 12/2020 | Morgenstern |

OTHER PUBLICATIONS

Linux "Context Switch Definition" online indexed on Feb. 18, 2010, [retrieved on Feb. 16, 2021]. Retrieved from the Internet: < URL: https://web.archive.org/web/20100218115342/http://www.linfo.org/context_switch.html> (Year: 2010).*

Anonymous; "Chapter 15: Memory Mapping and DMA"; Memory Management in Linux; Jan. 21, 2005, 52 pages.

Anonymous; "Database Optimizer Based on Column Usage-Context"; An IP.com Prior Art Database Technical Disclosure: IPCOM000246232D; May 18, 2016; 4 pages.

Anonymous; "GRC Integration Protocol"; An IP.com Prior Art Database Techinical Disclosure: IPCOM000232450D; Nov. 11, 2013; 8 pages.

Anonymous; "Share Maps: An Application Independent Mechanism for Socially Combining Network Domains"; An IP.com Prior Art Database Technical Disclosure: IPCOM000243494D; Sep. 24, 2015; 5 pages.

Anonymous; "System and Method for Clustering ensuring Convexity in Subspaces;" An IP.com Prior Art Database Techinical Disclosure: IPCOMM000233885D; Dec. 26, 2013; 4 pages.

IBM; "A Materialized View Management System and Method to Scale up Classification and Dynamic Extension in Practical ORM System Loosely Coupled with Ontology Repository"; IP.com: IPCOM000168011D; Feb. 28, 2008; 7 pages.

IBM; "Method and System for dynamic extensible process address space (process address space virtulization)"; An IP.com Prior Art Database Technical Disclosure: IPCOM000187697D; Sep. 16, 2009; 4 pages.

List of IBM Patents or Patent Applications Treated as Related; Date Filed: Jun. 28, 2019; 2 pages.

Morgenstern et al.; "Dynamically Joining and Splitting Dynamic Address Translation (DAT) Tables Based On Operational Context"; U.S. Appl. No. 16/456,075, filed Jun. 28, 2019.

Tzortzatos et al.; "Access To Dynamic Address Translation Across Multiple Spaces for Operational Context Subspaces"; U.S. Appl. No. 16/456,006, filed Jun. 28, 2019.

Tzortzatos et al.; "Operational Context Subspaces"; U.S. Appl. No. 16/456,000, filed Jun. 28, 2019.

List of IBM Patents or Patent Applications Treated as Related; Date Filed: May 12, 2021; 2 pages.

Morgenstern et al.; "Dynamically Joining and Splitting Dynamic Address Translation (DAT) Tables Based on Operational Context"; U.S. Appl. No. 17/128,664, filed Dec. 21, 2020.

* cited by examiner

PRIVATE SPACE CONTROL WITHIN A COMMON ADDRESS SPACE

BACKGROUND

The present invention relates to highly configurable memory architecture, and more specifically, to highly configurable memory architecture having a private subspace that uses a partial dynamic address translation (DAT) structure.

SUMMARY

Embodiments of the present invention are directed to private space control within a common address space. A non-limiting example computer-implemented method includes receiving, via a processor, instructions to switch an operational context of a dynamic address translation (DAT) structure to a new operational context. It is determined, via the processor, if context switching has been enabled within the DAT structure. Based on determining that context switching is enabled, it is determined, via the processor, if the new operational context of the DAT structure is different than a current operational context of the DAT structure. It is chosen, by the processor, whether to switch to a full operational context based on the new operational context being different than the current operational context. If the full operational context is used, a full space DAT structure is set up and a private space bit is set to OFF, and if the full operational context is not used, a partial space DAT structure is set up and the private space bit is set to ON.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
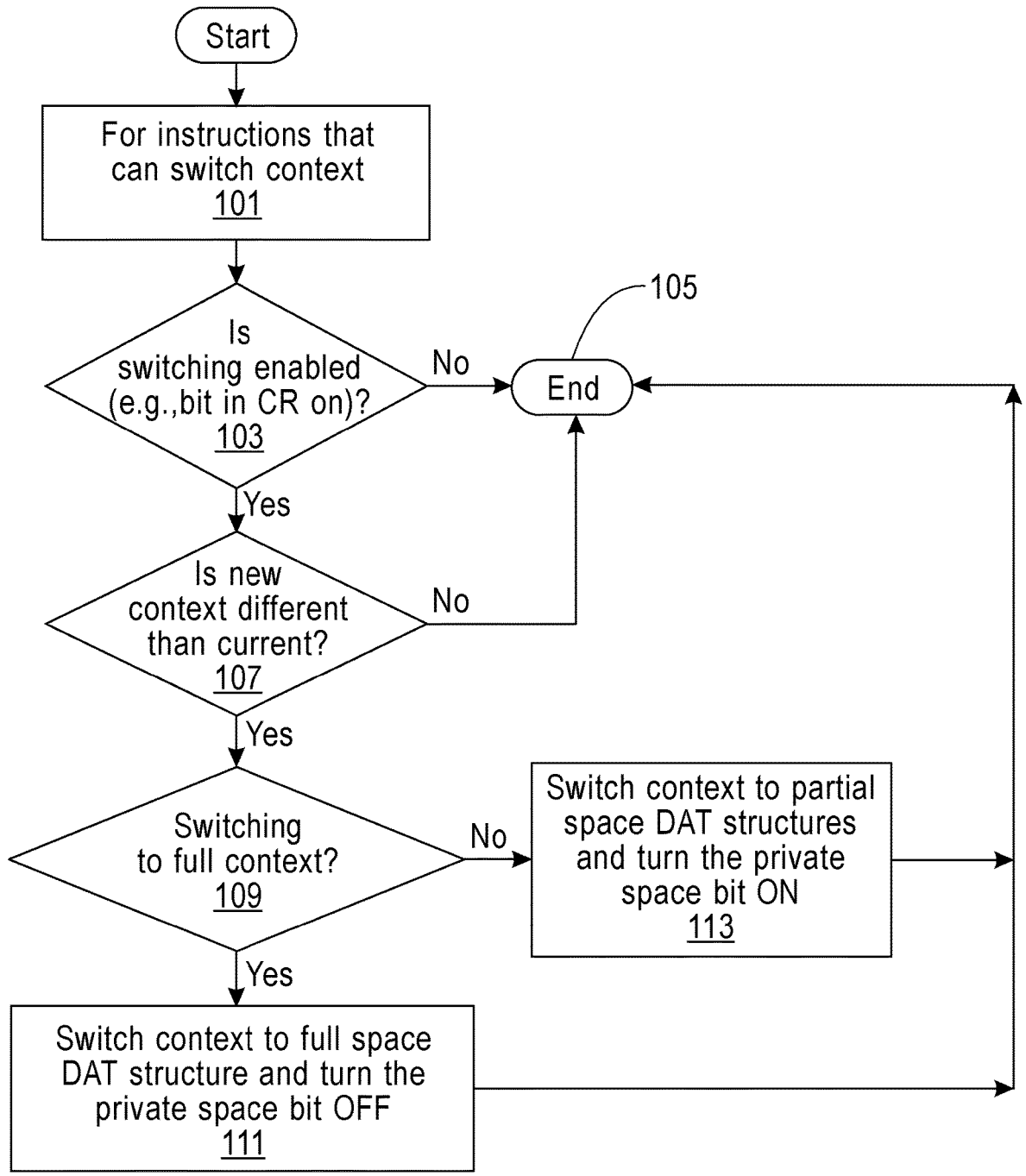
FIG. 1 illustrates a flow diagram of a process according to one or more embodiments of the present invention.

In accordance with one or more embodiments of the present invention, an address space can be mapped to a subset of a common area used by other address spaces. One or more embodiments of the present invention are compared to contemporary systems where all address spaces sharing a common area must map the entire common area of the address space in the same way. This ability to map to a subset of the common area can result in improved system performance by allowing more virtual memory to be used use for private space or to limit access to some virtual memory locations.

Dynamic address translation (DAT) tables are created to map virtual address to real addresses in a memory structure. Each address space has unique DAT tables and real page frames for linking back the virtual pages to real addresses. DAT is the process of translating a virtual address during a storage reference into the corresponding real address. If the virtual address is already in central storage, the DAT process may be accelerated through the use of a translation lookaside buffer (TLB). If the virtual address is not in central storage, it is brought in from auxiliary storage. DAT can be implemented by both hardware and software through the use of page tables, segment tables, region tables, and TLBs.

An address space is the range of virtual addresses that an operating system (OS) assigns to a user or separately running program. The address space is typically an area of contiguous virtual addresses available for executing instructions and storing data. A virtual storage layout of an address space includes, among other things, a private area and a common area. The common area contains system control programs and control blocks including, for example, a prefixed storage area (PSA), a common service area (CSA), a pageable link pack area (PLPA), a fixed link pack area (FLPA), a modified link pack area (MLPA), a system queue area (SQA), and nucleus. Multiple address spaces can use the same common area. The private area contains, for example, a local system queue area (LSQA), a scheduler work area (SWA), and a private region for running programs and storing data.

An address space is referenced by an address space control element (ASCE) which is made up of the address of the highest level translation table for that address space. When operating in a secure environment, the private area uses a private-space control bit to restrict access. One private-space-control bit is bit 55 of the ASCE which indicates whether the space (e.g., a data space or real space) is private. When the private-space-control bit is set to ON, TLB entries within common segments do not apply to this space. The private-space-control bit also disables other features for that space including fetch protection override of PSA and low-address protection of PSA, and use of common regions.

IBM's z/OS® can activate fetch-protection-override, which causes fetch protection to be ignored for about the first two thousand (2K) virtual addresses (e.g., VSAs 0-2047). This allows programs executing with any key to read the first 2K of the PSA even though the frame is "fetch" protected. Key protection includes a two level protection structure, comprised of a supervisory level (key 0) and a non-supervisory level (keys 1-15). Supervisory programs can access non-supervisory assigned storage blocks, but the non-supervisory programs cannot access the supervisory assigned storage blocks. The second 2K (e.g., VSAs 2048-4095) of the first page of the PSA is protected from read access by non-key 0 programs. However, fetch-protection-override does not apply when the private-space-control bit in the ASCE is set to ON.

An address space that is mapped to a subset of a common area used by other address spaces is referred to herein as a "partial address space" and an address space that maps to the entire common area is referred to herein as a "full address space." These address spaces can be used to control access to some storage such as those in an operational context subspace (OCS). An OCS can be RAS (reliability, availability, serviceability) characteristics such as task transaction isolation or be based on a security context. For a partial address space ASCE, the private-space-control bit settings and it's DAT structures will never have a common segment bit set to ON.

When operating in a secure environment requiring partial space control, the private-space-control bit is set (e.g., to ON) in the ASCE. For (OCS), the millicode turns on the private-space-control bit in the ASCE when it switches to run in the partial space.

Turning now to a more detailed description of one or more embodiments of the present invention, FIG. 1 depicts a flow diagram of a process for configuring a memory architecture having dynamic address translation (DAT) structures. The embodiment of the process shown in FIG. 1 starts at block 101 by receiving instructions to switch an operational context of a dynamic address translation (DAT) structure. The process then determines, at block 103, if context switching has been enabled within the DAT structure. If context switching has not been enabled, then processing ends at block 105. If context switching has been enabled, as determined at block 103, then the process continues at block 107 to determine if the new operational context (specified, for example, by the received instructions) is different than a current operational context. The process ends at block 105 if it is determined, at block 107, that the new operational context is not different than the current operational context. Otherwise, processing continues at block 109 to determine whether the new context is a full operational context. If the new context is a full operational context, processing continues at block 111 where the context is switched to a full space context by setting up a full space DAT structure and setting the private space bit to OFF. The process then ends at block 105. If it is determined at block 109 that the new operational context is not a full operational context, the context is switched to a partial space context at block 113 by setting up a partial space DAT structure and setting the private space bit to ON. The process then ends at block 105.

Still referring to FIG. 1, the flow process allows for a highly configurable memory architecture when using partitioned global address space memory having subspace configurable tables. Global address space memory provides a shared memory programming model abstraction that can be implemented on machines that do not provide shared memory. In this system the global address space is realized by central processing units (CPUs) making their private memory accessible to other CPUs through the memory and input/output (I/O). The process shown in FIG. 1 further allows for the mapping of common memory ranges while providing efficient use of TLB mapping for virtual addresses.

Figure 2:
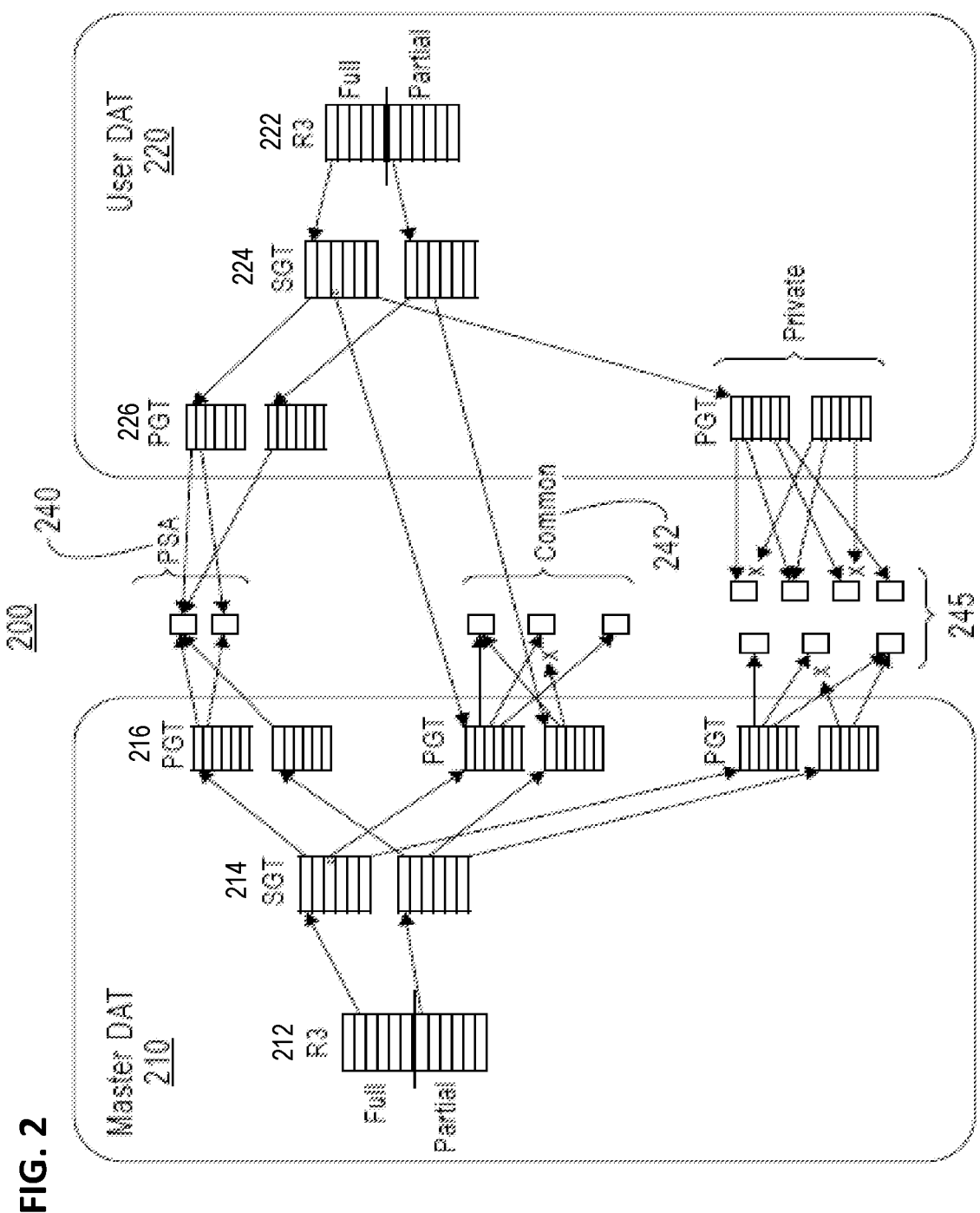
FIG. 2 illustrates a dynamic address translation (DAT) structure according to one or more embodiments of the present invention.

Referring to FIG. 2, a common DAT structure 200 according to one or more embodiments of the present invention includes an array memory structure having a master DAT 210 and a user DAT 220. Both the master DAT 210 and the user DAT 220 are arrayed to function as either a full DAT structure or as a partial DAT structure. The master DAT 210 includes a region third table R3 212 being partitioned in half into a full portion and a partial portion. Similarly, a segment table (SGT) 214 has a full portion and a partial portion. The master DAT 210 also includes a plurality of page tables (PGT) 216, each having a full portion and a partial portion. As shown in the master DAT 210 mapping example, access to various data in registers PSA 240, common registers 242 and others registers 245 depends on the private space control bit settings.

Still referring to FIG. 2, the user DAT 220 includes a region third table R3 222 being partitioned into a half, a full portion, and a partial portion. Similarly, a segment table (SGT) 224 has a full portion and a partial portion. The user DAT 220 also includes a plurality of PGT 226 page tables, each having a full portion and a partial portion. As shown in the user DAT 220 mapping example of FIG. 2, access to various data in the prefix save area (PSA) 240, common registers 242 via PGT of the master DAT 210, and private registers 245 is provided depending on which portion of the highest DAT table (R3 222) was accessed.

When the private-space-control bit is set to ON it also disables fetch protection override of the first 2K of the PSA (e.g., VSAs 0-2047). The entire first page of the PSA will be made non-fetch protected and mapped in both the full and partial spaces. However, because each PSA is also mapped in the system queue area (SQA), the SQA Page table entries (PTEs) for each PSA will still indicate that it is fetched protected so that it is never mapped in the partial space. It is therefore important that the second 2K (e.g., VSAs 2048-4095) of the PSA contain no sensitive fields because the page has no fetch protection.

Figure 3:
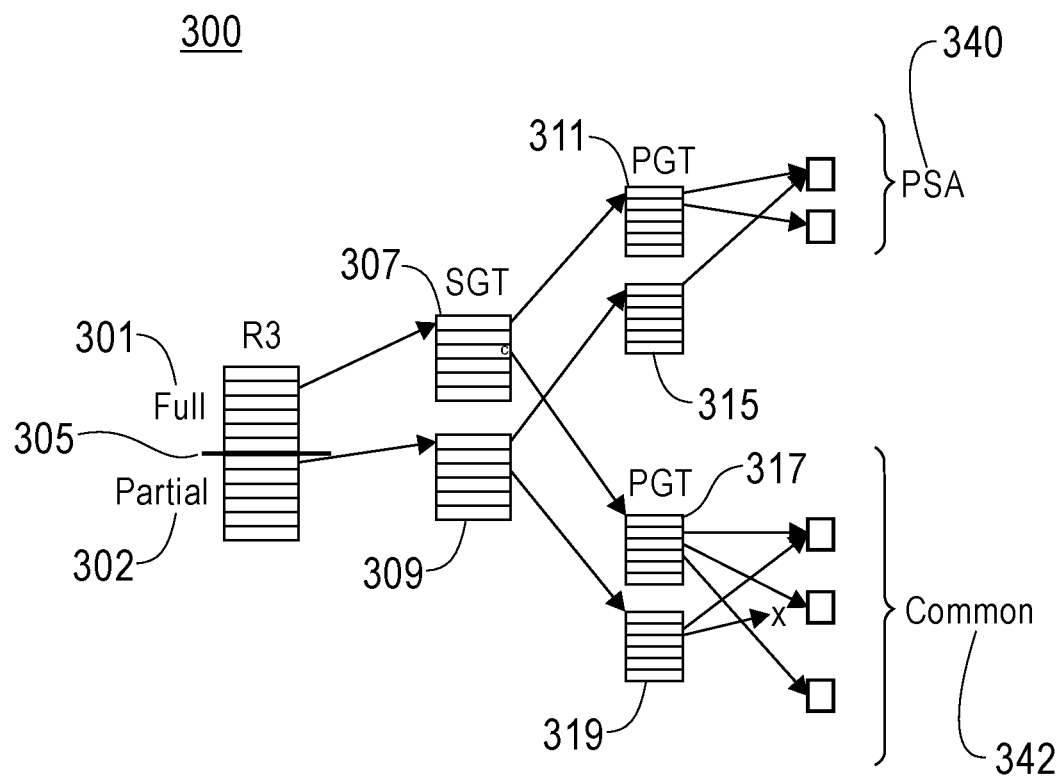
FIG. 3 illustrates another DAT structure according to one or more embodiments of the present invention.

Referring to FIG. 3, a simplified common DAT structure 300 according to one or more embodiments of the present invention includes an array memory structure having a register R3 that is partitioned 305 into a half portion, a full portion 301 and a partial portion 302. Similarly, a segment table SGT has a full portion 307 and a partial portion 309. The simplified common DAT structure 300 also includes a plurality of page tables PGT, each having a full portion (311 and 317) and a partial portion (315 and 319). As shown in the simplified common DAT structure 300 mapping example of FIG. 3, access is provided to various data in registers PSA 340 and common registers 342 depending on a private space control bit setting. For example, if the private space control bit is set to OFF, a user has access to the full portion 307 of segment table SGT, page tables PGT (311 and 317), the PSA 340, and common registers 342. If private space control bit is set to ON, a user only has access to the partial portion 309 of segment table SGT, PGT registers (315 and 319), the PSA 340, and only some common registers 342.

Figure 4:
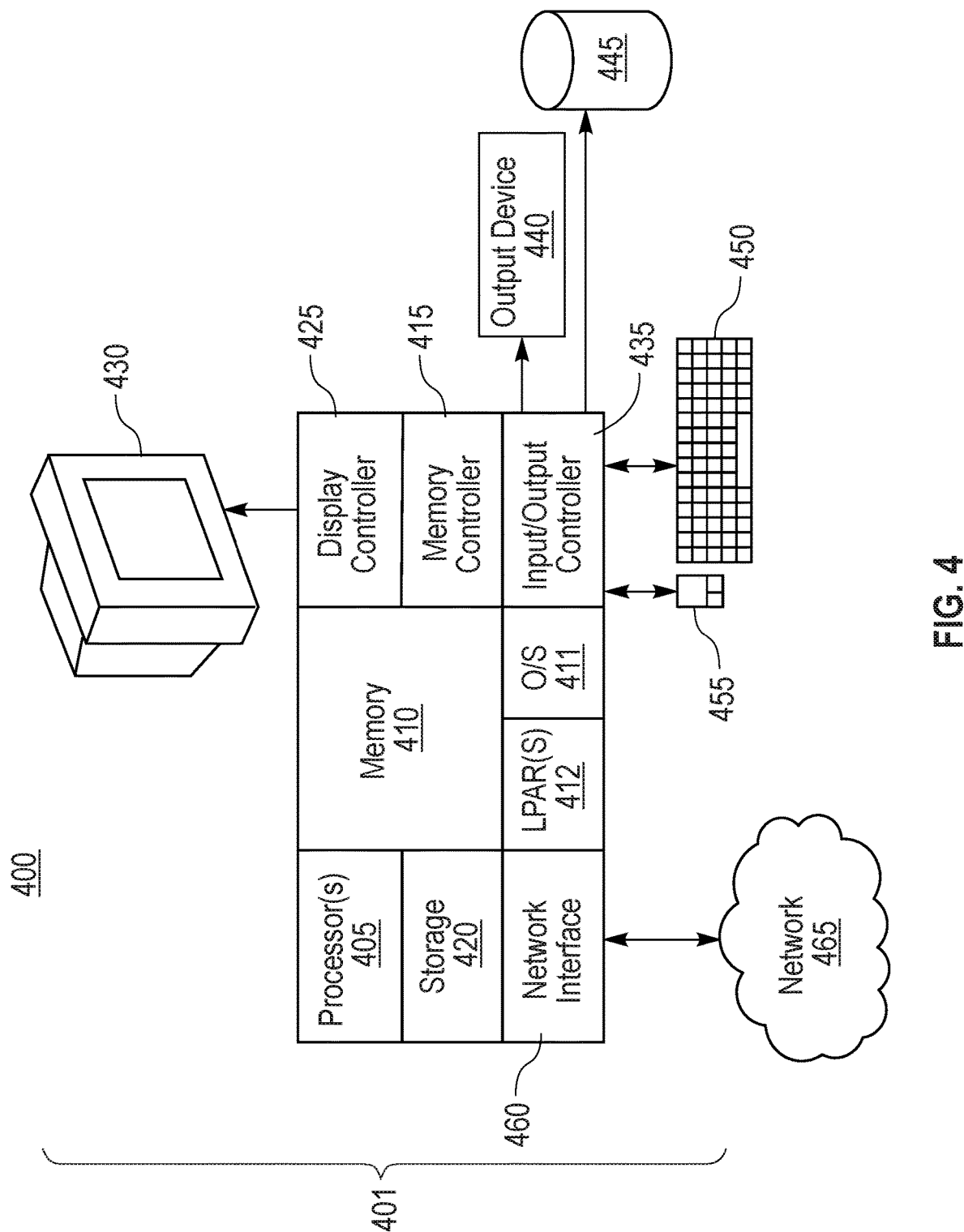
FIG. 4 illustrates a computer system according to one or more embodiments of the present invention.

Turning now to FIG. 4, a computer system 400 for private space control within a common address space is generally shown in accordance with one or more embodiments of the present invention. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 400 therefore may include general-purpose computer or mainframe computer 401 capable of running multiple instances of an O/S simultaneously.

In an exemplary embodiment, in terms of hardware architecture, as shown in FIG. 4, the computer 401 includes one or more processors 405, memory 410 coupled to a memory controller 415, and one or more input and/or output (I/O) devices 440, 445 (or peripherals) that are communicatively coupled via a local input/output controller 435. The input/output controller 435 can be, for example but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 435 may include a plurality of sub-channels configured to access the output devices 440 and 445. The sub-channels may include fiber-optic communications ports.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which comprises an ordered listing of executable instructions for implementing logical functions. In the example of FIG. 4, the instructions in the memory 410 a suitable operating system (OS) 411. The operating system 411 essentially controls the execution of other computer programs and provides scheduling, input-output control, file and data management, memory management, and communication control and related services.

The memory 410 may include multiple logical partitions (LPARs) 412, each running an instance of an operating system. The LPARs 412 may be managed by a hypervisor, which may be a program stored in memory 410 and executed by the processor 405.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 410 may further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute instructions stored within the memory 410, to communicate data to and from the memory 410, and to generally control operations of the computer 401 pursuant to the instructions.

Figure 5:
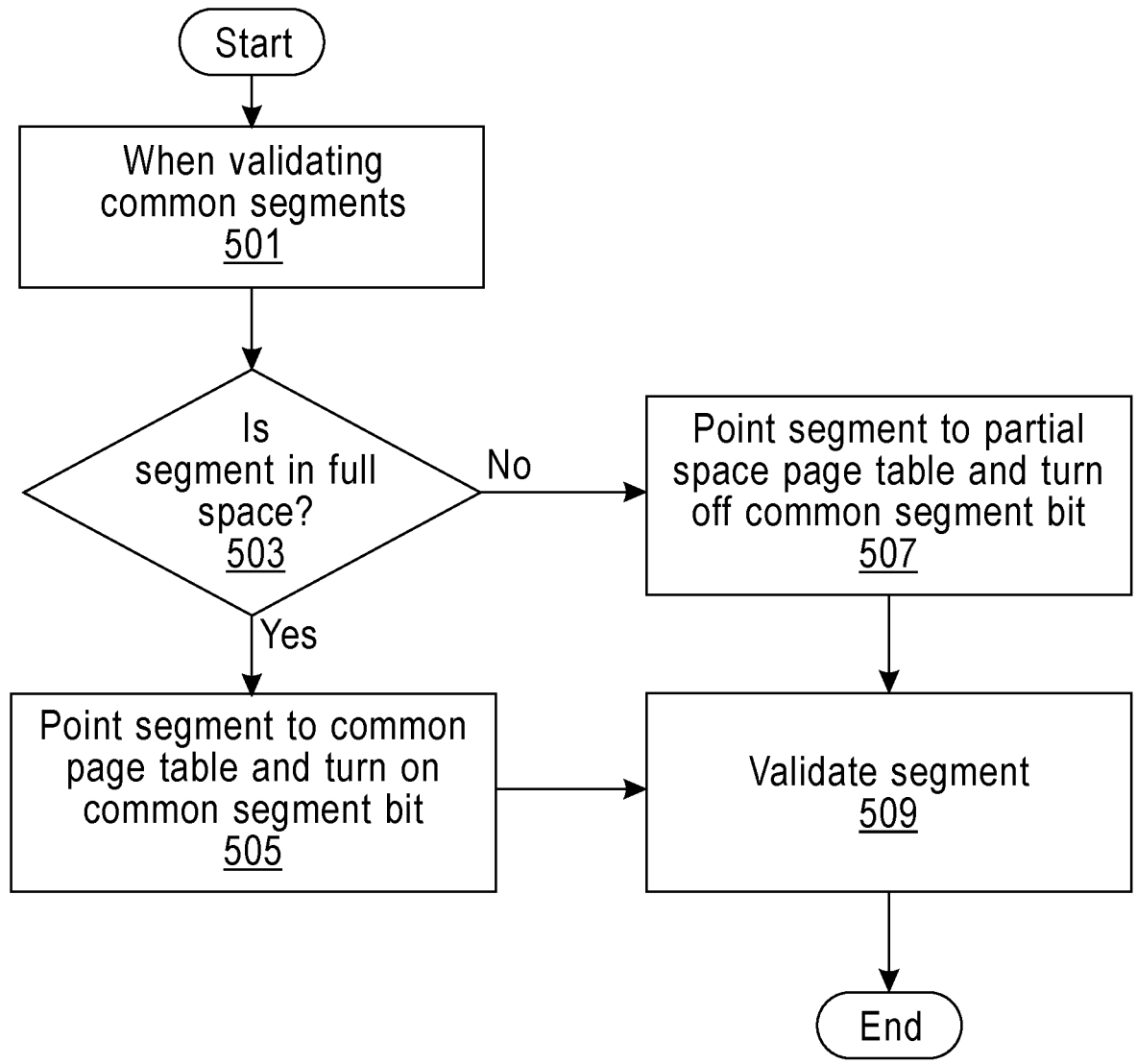
FIG. 5 illustrates another flow diagram of a process according to one or more embodiments of the present invention.
Figure 2:
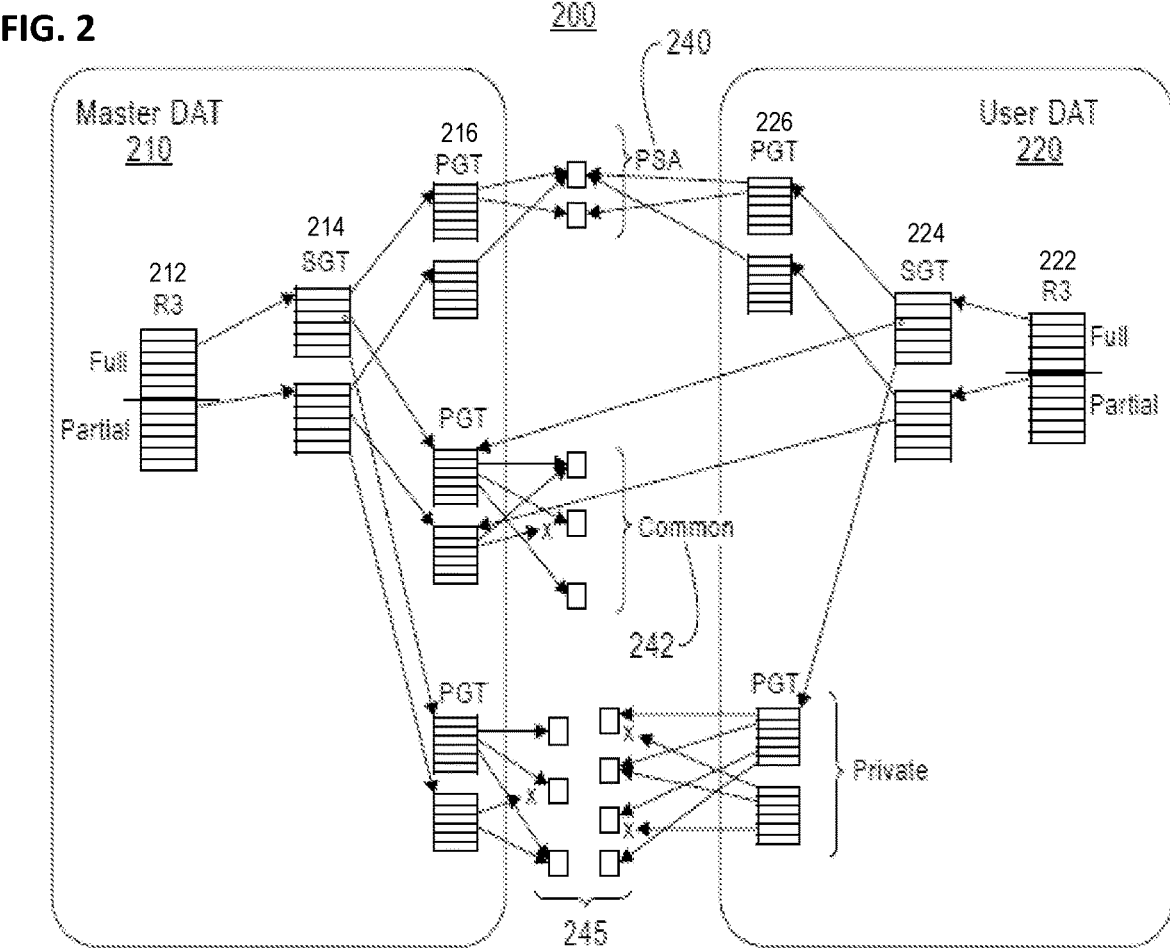

Referring to FIG. 5, illustrated is another flow diagram of a process according to one or more embodiments of the present invention. The process starts at block 501 by validating common segments in a DAT structure. During validation the process determines, at block 503, if a segment is a FULL space. If the segment is not a FULL space the segment is pointed to a partial space page table of the DAT structure and common segment bit is set to OFF at block 507. The segment is then validated at block 509 and the process ends. If the segment is a FULL space, the segment is pointed to a common space page table of the DAT structure and common segment bit is set to ON at block 505. The segment is then validated at block 509 and the process ends.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Aspects of the invention are not limited in their application to the details of construction and the arrangement of the components set forth in the following description or illustrated in the drawings. The embodiments of the invention described herein are applicable to other embodiments or are capable of being practiced or carried out in various ways. The phraseology and terminology employed herein are for the purpose of description and should not be regarded as limiting. As will be appreciated by one skilled in the art, aspects of the present invention can be embodied as a system, method or computer program product.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, via a processor, instructions to switch an operational context of a dynamic address translation (DAT) structure to a new operational context;
determining, via the processor, if context switching has been enabled by a bit in a control register within the DAT structure;
based on determining that context switching is enabled, determining, via the processor, if the new operational context of the DAT structure is different than a current operational context of the DAT structure as specified in the instructions having been received;
choosing, via the processor, whether to switch to a full operational context based on the new operational context being different than the current operational context;
responsive to the new operational context being the full operational context, responsive to the new operational context being different than the current operational context, and responsive to the context switching being enabled, setting up a full space DAT structure and setting to OFF a private space bit; and
responsive to the full operational context not being used, setting up a partial space DAT structure and setting to ON the private space bit.

2. The method according to claim 1, further comprising setting the private space control bit to ON via an address space control element (ASCE).

3. The method according to claim 1, further comprising setting the private space control bit to ON via millicode.

4. The method according to claim 1, wherein when the private space control bit is set to ON, a common segment bit in the partial space DAT structure is set to OFF.

5. The method according to claim 4, wherein when the private space control bit is set to ON, prefixed storage area (PSA) addresses of an address space are non-fetch protected.

6. The method according to claim 5, wherein when the PSA addresses of the address space is non-fetch protected, no sensitive data is stored in a first portion of memory for the PSA addresses.

7. The method according to claim 1, wherein the DAT structure is created by mapping address spaces in a memory, the full space DAT structure mapping to a full portion segment table that maps to at least one full portion page table that maps to registers, the partial space DAT structure mapping to a partial portion segment table that maps to a partial portion page table that maps to a subset of the registers.

8. A system comprising:
a memory having computer readable instructions; and one or more processors for executing the computer readable instructions, the computer readable instructions controlling the one or more processors to perform operations comprising:
receiving instructions to switch an operational context of a dynamic address translation (DAT) structure to a new operational context;
determining if context switching has been enabled by a bit in a control register within the DAT structure;
based on determining that context switching is enabled, determining if the new operational context of the DAT structure is different than a current operational context of the DAT structure as specified in the instructions having been received;
choosing whether to switch to a full operational context based on the new operational context being different than the current operational context;
responsive to the new operational context being the full operational context, responsive to the new operational context being different than the current operational context, and responsive to the context switching being enabled, setting up a full space DAT structure and setting to OFF a private space bit; and
responsive to the full operational context not being used, setting up a partial space DAT structure and setting to ON the private space bit.

9. The system according to claim 8, wherein the operations further comprise setting the private space control bit to ON via an address space control element (ASCE).

10. The system according to claim 8, wherein the operations further comprise setting the private space control bit to ON via millicode.

11. The system according to claim 8, wherein when the private space control bit is set to ON, a common segment bit in the partial space DAT structure is set to OFF.

12. The system according to claim 11, wherein when the private space control bit is set to ON, prefixed storage area (PSA) addresses of an address space are non-fetch protected.

13. The system according to claim 12, wherein when the PSA addresses of the address space is non-fetch protected, no sensitive data is stored in a first portion of memory for the PSA addresses.

14. The system according to claim 8, wherein the dynamic address translation (DAT) structure is created by mapping address spaces in a memory.

15. A computer program product comprising a computer readable storage medium having program instructions embodied therewith, the program instructions executable by a processor to cause the processor to perform operations comprising:
receiving instructions to switch an operational context of a dynamic address translation (DAT) structure to a new operational context;
determining if context switching has been enabled by a bit in a control register within the DAT structure;
based on determining that context switching is enabled, determining if the new operational context of the DAT structure is different than a current operational context of the DAT structure;
choosing whether to switch to a full operational context based on the new operational context being different than the current operational context;
responsive to the new operational context being the full operational context, responsive to the new operational context being different than the current operational context, and responsive to the context switching being enabled, setting up a full space DAT structure and setting to OFF a private space bit; and
responsive to the full operational context not being used, setting up a partial space DAT structure and setting to ON the private space bit.

16. The computer program product according to claim 15, wherein the operations further comprise setting the private space control bit to ON via an address space control element (ASCE).

17. The computer program product according to claim 15, wherein the operations further comprise setting the private space control bit to ON via millicode.

18. The computer program product according to claim 15, wherein when the private space control bit is set to ON, a common segment bit in the partial space DAT structure is set to OFF.

19. The computer program product according to claim 18, wherein when the private space control bit is set to ON, prefixed storage area (PSA) addresses of an address space are non-fetch protected.

20. The computer program product according to claim 15, wherein the dynamic address translation (DAT) structure is created by mapping address spaces in a memory.

* * * * *